(12) United States Patent
Edick

(10) Patent No.: US 10,735,828 B2
(45) Date of Patent: Aug. 4, 2020

(54) ON-DEMAND AND REAL-TIME TRAILER GENERATION SYSTEMS AND METHODS

(71) Applicant: Joe Edick, North Muskegon, MI (US)

(72) Inventor: Joe Edick, North Muskegon, MI (US)

( * ) Notice: Subject to any disclaimer, the term of this patent is extended or adjusted under 35 U.S.C. 154(b) by 0 days.

(21) Appl. No.: 15/792,021

(22) Filed: Oct. 24, 2017

(65) Prior Publication Data

US 2019/0124420 A1    Apr. 25, 2019

(51) Int. Cl.
| | |
|---|---|
| *H04N 21/8549* | (2011.01) |
| *H04N 21/214* | (2011.01) |
| *H04N 21/854* | (2011.01) |
| *H04N 21/472* | (2011.01) |
| *H04N 21/414* | (2011.01) |
| *H04N 21/4788* | (2011.01) |
| *H04N 21/2743* | (2011.01) |

(52) U.S. Cl.
CPC ....... *H04N 21/8549* (2013.01); *H04N 21/214* (2013.01); *H04N 21/2743* (2013.01); *H04N 21/41415* (2013.01); *H04N 21/4788* (2013.01); *H04N 21/47205* (2013.01); *H04N 21/85406* (2013.01)

(58) Field of Classification Search
CPC .................................................. H04N 21/8549
See application file for complete search history.

(56) References Cited

U.S. PATENT DOCUMENTS

| | | | |
|---|---|---|---|
| 5,264,933 A | 11/1993 | Rosser et al. | |
| 5,774,170 A | 6/1998 | Hite et al. | |
| 6,069,637 A | 5/2000 | Gaglione et al. | |
| 6,141,530 A | 10/2000 | Rabowsky | |
| 6,229,895 B1 | 5/2001 | Son et al. | |
| 6,362,816 B1 | 3/2002 | Kawanami et al. | |
| 6,381,362 B1 | 4/2002 | Deshpande et al. | |
| 6,384,893 B1 | 5/2002 | Mercs et al. | |
| 7,992,175 B2 | 8/2011 | Kahn et al. | |
| 2002/0072966 A1 | 6/2002 | Eldering et al. | |
| 2002/0095679 A1 | 7/2002 | Bonini | |
| 2003/0110132 A1 | 6/2003 | Sako | |
| 2003/0188316 A1 | 10/2003 | DePrez | |
| 2003/0204851 A1 | 10/2003 | Powell et al. | |
| 2004/0181819 A1 | 9/2004 | Theiste et al. | |
| 2004/0194123 A1 | 9/2004 | Fredlund et al. | |
| 2008/0209326 A1* | 8/2008 | Stallings | G11B 27/034 715/719 |
| 2014/0172856 A1* | 6/2014 | Imbruce | G06F 17/212 707/737 |
| 2014/0282686 A1* | 9/2014 | Silverman | H04N 21/2407 725/31 |
| 2015/0220967 A1* | 8/2015 | Ikai | G06Q 30/0241 705/14.4 |
| 2016/0044387 A1* | 2/2016 | Zucchetta | H04N 21/458 725/32 |
| 2016/0088335 A1* | 3/2016 | Zucchetta | H04N 21/2343 725/32 |

\* cited by examiner

*Primary Examiner* — Girumsew Wendmagegn
(74) *Attorney, Agent, or Firm* — King & Partners, PLC

(57) ABSTRACT

A method including the steps of: displaying a graphical user interface (GUI) that includes an input interface that receives a user-selected file that includes at least one image; receiving the user-selected content; converting, on-demand, the user-selected content into a digital cinema package file by combining the user-selected file with a templated media; and outputting, on-demand, the digital cinema package file for presentation within a theatre.

4 Claims, 28 Drawing Sheets

Trailer Constructor

The trailer constructor consists of two main elements: A website running a PHP-driven form input page; and a suite of Windows command scripts -- batch files -- that runs concurrently and interactively with the web server.

Vardata

ALLUSERSPROFILE=C:\ProgramData
annotation=
APPDATA=C:\Users\User\AppData\Roaming
avconvpath=C:\ProgramData\libav-11.3-win64\win64\usr\bin
batdir=C:\ProgramData\SIOS\Batch
blend=100
blendrate=10
canvasdir=C:\ProgramData\SIOS\trailers\Trailer01\canvas\Flat
canvasfile=216.png
celebrant="Ellinor"
clientdir=C:\ProgramData\SIOS\Clients\XXXXXX
ClientID=XXXXXX
CommonProgramFiles=C:\Program Files\Common Files
CommonProgramFiles(x86)=C:\Program Files (x86)\Common Files
CommonProgramW6432=C:\Program Files\Common Files
COMPUTERNAME=TRIFLE
ComSpec=C:\Windows\system32\cmd.exe
daycheck=18
dd=17
doneCode=22632
dow=Mon
ElapsedTime=106
endframe=216
fastcopy=1
fileExt=jpg
fileout=ML.png
fill=gold
font=Brannboll-F-PERSONAL-USE-ONLY
FP_NO_HOST_CHECK=NO
frame=217
framenum=216
gotheight=124
gotwidth=252
height=595
HOMEDRIVE=C:
HOMEPATH=\Users\User
hour=06
hsec=74
imagename=XXXXXX_20170717_061516.jpg
interval=4
issuer=Say It On Screen

FIG. 5.1

```
kind=advertisement
lastframenum=216
last_trigger=C:\ProgramData\Hiawatha\sios\temp\20170717_001618_XXXXXX.bat
lingercount=0
LOCALAPPDATA=C:\Users\User\AppData\Local
LOGONSERVER=\\TRIFLE
magickpath=C:\Program Files\ImageMagick-7.0.4-Q16
mdy=07/17/2017
min=17
mm=07
mp4name=C:\ProgramData\Hiawatha\sios\sios\XXXXXX_20170717_061516.mp4
NUMBER_OF_PROCESSORS=8
odcppath=C:\Program Files\OpenDCP\bin
offset=+479-125
OS=Windows_NT
outdir=C:\ProgramData\SIOS\cleanup
outfile=C:\ProgramData\SIOS\cleanup\XXXXXX_20170717_061516.bat
outname=XXXXXX_20170717_061516
padframe=217
padframenum=216
pagename=XXXXXX_20170717_061516.html
Path=C:\ProgramData\libav-11.3-win64\win64\usr\bin;C:\Program Files\ImageMagick-7.0.4-
Q16;C:\ProgramData\Oracle\Java\javapath;C:\Windows\system32;C:\Windows;C:\Windows\Sys
tem32\Wbem;C:\Windows\System32\WindowsPowerShell\v1.0\;C:\Program Files (x86)\NVIDIA
Corporation\PhysX\Common;C:\Program Files (x86)\Calibre2\;C:\Program Files\Ferro
Software\FtpUse;C:\Windows\System32\WindowsPowerShell\v1.0\
PATHEXT=.COM;.EXE;.BAT;.CMD;.VBS;.VBE;.JS;.JSE;.WSF;.WSH;.MSC
picname=Ellinor.jpg
points=100
PROCESSOR_ARCHITECTURE=AMD64
PROCESSOR_IDENTIFIER=Intel64 Family 6 Model 60 Stepping 3, GenuineIntel
PROCESSOR_LEVEL=6
PROCESSOR_REVISION=3c03
ProgramData=C:\ProgramData
ProgramFiles=C:\Program Files
ProgramFiles(x86)=C:\Program Files (x86)
ProgramW6432=C:\Program Files
PROMPT=$P$G
PSModulePath=C:\Program
Files\WindowsPowerShell\Modules;C:\Windows\system32\WindowsPowerShell\v1.0\Modules
PUBLIC=C:\Users\Public
rating=G
ratio=Flat
rotate=345
sec=12
siosdir=C:\ProgramData\SIOS
sitedir=C:\ProgramData\Hiawatha\sios
srcfile=MR.png
startCode=22526
```

FIG. 5.2 startframe=122
stray=C:\ProgramData\Hiawatha\sios\temp\20170717_061516_XXXXXX.bat
strlength=7
strokec=goldenrod
strokew=1
SystemDrive=C:
SystemRoot=C:\Windows
TEMP=C:\Users\User\AppData\Local\Temp
text="Ellinor"
tgtfolder=C:\ProgramData\SIOS\working\20170717_061516_XXXXXX
timeCode=20170717_061516
timestring=6:17:12.74
title=Birthday Greeting
TMP=C:\Users\User\AppData\Local\Temp
trailerdir=C:\ProgramData\SIOS\trailers\Trailer01
trailernum=01
USERDOMAIN=Trifle
USERNAME=User
USERPROFILE=C:\Users\User
vlcpath=C:\Program Files\VideoLAN\VLC
wasday=17
wasmonth=07
wasname=XXXXXX_20170717_061516
wasyear=2017
watchdir=C:\ProgramData\Hiawatha\sios\temp
webdir=C:\ProgramData\Hiawatha\sios
webfeed=C:\ProgramData\Hiawatha\sios\sios\XXXXXX_20170717_061516.html
webimage=XXXXXX_20170717_061516.png
width=595
windir=C:\Windows
windows_tracing_flags=3
windows_tracing_logfile=C:\BVTBin\Tests\installpackage\csilogfile.log
workdir=C:\ProgramData\SIOS\working\20170717_061516_XXXXXX
yyyy=2017
zipname=C:\ProgramData\Hiawatha\sios\sios\XXXXXX_20170717_061516.zip
zippath=C:\Program Files\7-Zip

Vardata1 annotation=
avconvpath=C:\ProgramData\libav-11.3-win64\win64\usr\bin
batdir=C:\ProgramData\SIOS\Batch
blend=100
blendrate=10
canvasdir=C:\ProgramData\SIOS\trailers\Trailer01\canvas\Flat
canvasfile=216.png
celebrant="Elinor"
clientdir=C:\ProgramData\SIOS\Clients\XXXXXX
ClientID=XXXXXX

FIG. 5.3 doneCode=1109
ElapsedTime=119
endframe=216
fileExt=jpg
fileout=ML.png
fill=gold
font=Brannboll-F-PERSONAL-USE-ONLY
frame=217
framenum=216
gotheight=118
gotwidth=231
height=510
hour=00
hsec=75
imagename=XXXXXX_20170717_001618.jpg
interval=4
issuer=Say It On Screen
kind=advertisement
lastframenum=216
last_trigger=C:\ProgramData\Hiawatha\sios\temp\20170717_000758_XXXXXX.bat
lingercount=0
magickpath=C:\Program Files\ImageMagick-7.0.4-Q16
min=18
mp4name=C:\ProgramData\Hiawatha\sios\sios\XXXXXX_20170717_001618.mp4
odcppath=C:\Program Files\OpenDCP\bin
offset=+479-125
padframe=217
padframenum=216
pagename=XXXXXX_20170717_001618.html
picname=Ellinor.jpg
points=100
rating=G
ratio=Flat
rotate=345
sec=29
siosdir=C:\ProgramData\SIOS
sitedir=C:\ProgramData\Hiawatha\sios
srcfile=MR.png
startCode=990
startframe=122
stray=C:\ProgramData\Hiawatha\sios\temp\20170717_001618_XXXXXX.bat
strlength=6
strokec=goldenrod
strokew=1
text="Elinor"
tgtfolder=C:\ProgramData\SIOS\working\20170717_001618_XXXXXX
timeCode=20170717_001618
timestring=0:18:29.75
title=Birthday Greeting

FIG. 5.4 trailerdir=C:\ProgramData\SIOS\trailers\Trailer01
trailernum=01
vlcpath=C:\Program Files\VideoLAN\VLC
watchdir=C:\ProgramData\Hiawatha\sios\temp
webdir=C:\ProgramData\Hiawatha\sios
webfeed=C:\ProgramData\Hiawatha\sios\sios\XXXXXX_20170717_001618.html
webimage=XXXXXX_20170717_001618.png
width=510
workdir=C:\ProgramData\SIOS\working\20170717_001618_XXXXXX
zipname=C:\ProgramData\Hiawatha\sios\sios\XXXXXX_20170717_001618.zip
zippath=C:\Program Files\7-Zip

Constructor

```
::      constructor.bat
::      example: custom work "Alexandria" logos\000011 bdaypic\Alexandria.jpg
::      Prior to running this script, fido.bat will have called shepherd.bat.
::      Shepherd.bat will have created a series of variables:
::      variables set by Shepherd: webdir siosdir webfeed mp4name zipname webimage
clientdir workdir trailerdir
::      Shepherd.bat also creates the initial user feedback page %webfeed%; then calls this
constructor script.
@echo off ::      App_paths -- except for VLC, these apps are all critical to function.
::      Some paths are already listed in the environment %path% variable.
set magickpath=C:\Program Files\ImageMagick-7.0.4-Q16
set avconvpath=C:\ProgramData\libav-11.3-win64\win64\usr\bin
set odcppath=C:\Program Files\OpenDCP\bin
set zippath=C:\Program Files\7-Zip
set vlcpath=C:\Program Files\VideoLAN\VLC ::      default DCP XML Parameters: these are embedded in the Digital Cinema Package.
set issuer=Say It On Screen
set annotation=Copyright Pelican Productions, Inc.
set title=Custom Trailer
set rating=G
set kind=advertisement
::      Parameters specific to this trailer should exist and will replace some of the values above:
if exist %trailerdir%\DCPXML.bat call %trailerdir%\DCPXML.bat ::      Establish start time in terms of seconds elapsed in the current day.
echo %ClientID%_%timeCode%: Constructor marking the starting time (calling
%batdir%\time2var.bat)... >>%logdir%\%yyyy%%mm%.log call %batdir%\date2var.bat
call %batdir%\time2var.bat set /a startCode=%sec%+(%min%*60)+(%hour%*3600)
```

FIG. 5.5

```
if not exist %logdir%\%yyyy%%mm%.log echo. >%logdir%\%yyyy%%mm%.log
echo %ClientID%_%timeCode%: startCode=%startCode%>>%logdir%\%yyyy%%mm%.log ::      Numbered blank .PNGs of the correct size are pre-made to save processing time.
echo %ClientID%_%timeCode%: Acquiring blank frames>>%logdir%\%yyyy%%mm%.log
cd %workdir%
copy %trailerdir%\blanks\???.png .>nul
::      Check for the last frame.
::      This will vary from one trailer to another so must become a variable.
::      This variable and perhaps others should be merged with those
::      of %trailerdir%\DCPXML.bat to >>make a trailer-specific parameters.bat<<
if exist 216.png echo Blank frameset acquired.

::      "Canvases" are video frames premade with unchanging elements to shorten processing time.
::      They are the background onto which the frame set will be overlaid.
::      Create a variable that points to their location:
set canvasdir=%trailerdir%\canvas\%ratio% echo %ClientID%_%timeCode%: Creating name graphic for %celebrant%...>>%logdir%\%yyyy%%mm%.log
::      Match style and size to the premade template.
call %batdir%\dotext %celebrant% Brannboll gold 100 1 goldenrod 345 ML.png ::      We have the formatted text graphic, but is it the right size?  It may be lengthy.
::      Reduce size to fit its allocated area if necessary, otherwise leave it alone.
call %batdir%\grabdims ML /q
set resize=0
if /i %gotwidth% GTR 720 set /a resize=resize+1
if /i %gotheight% GTR 266 set /a resize=resize+1
if /i %resize% GTR 0 magick convert ML.png -resize 720x266 ML.png
set resize= echo %ClientID%_%timeCode%: Preparing client logo.>>%logdir%\%yyyy%%mm%.log
::      Just resize it to fit its allocated area.
magick convert %siosdir%\Logos\%ClientID%.png -resize 720x400 MR.png ::      Magick (in the Windows version at least) has some processing issues with certain JPEGs.  It hangs interminably.
::      It prevents a product and will confuse the user because we can't even produce notification of the error.
::      It leaves instances of the Constructor stuck open and using resources which can eventually crash the server.
::      The following conversion to PNG using a simple command-line tool is a workaround.
::      The tool is Basic Image Converter by Jared Epstein (MaQleod)
https://sourceforge.net/projects/basicimgcnvt/
echo %ClientID%_%timeCode%: Converting JPEG photo to PNG format.>>%logdir%\%yyyy%%mm%.log
%siosdir%\utilities\convert.exe %webimage% %ClientID%_%timeCode%.png >nul
```

FIG. 5.6

```
set webimage=%ClientID%_%timeCode%.png

::      Resize the submitted photo and add drop shadow.
echo %ClientID%_%timeCode%: Preparing photo image.>>%logdir%\%yyyy%%mm%.log
magick convert %webimage% -resize 700x500 -alpha on ( +clone -background none -shadow 70x4 ) +swap -composite LL.png ::      Store a sized copy of the image in jpg form in the client's folder.
::      This may help with debug and could enable later reproduction of the trailer.
magick convert %webimage% -resize 700x500 %clientdir%\%timeCode%.jpg
del %webimage% echo %ClientID%_%timeCode%: Adding custom elements to the canvases...>>%logdir%\%yyyy%%mm%.log
::      Fade in each element into the blank .png frameset.
::      fadein.bat srcfilepath\name offset startframe endframe blendrate tgtfolder
call %batdir%\fadein LL.png -479+165 20 55 10 %workdir%
call %batdir%\fadein ML.png -479-230 51 132 20 %workdir%
call %batdir%\fadein MR.png +479-125 122 216 10 %workdir% echo %ClientID%_%timeCode%: compositing PNG frameset with the template TIFFs...>>%logdir%\%yyyy%%mm%.log ::      Merge TIFF canvases with the PNG frameset
set frame=0

:loop2
set /a frame=%frame%+1
set padframe=000%frame%
set padframe=%padframe:~-3% if not exist %canvasdir%\%padframe%.tif goto check if %ratio%==Scope magick convert %workdir%\%padframe%.png -resize 1547x836 %workdir%\%padframe%.png
magick composite -gravity center %workdir%\%padframe%.png %canvasdir%\%padframe%.tif %workdir%\%padframe%.tif goto loop2

:check
echo %ClientID%_%timeCode%: Deleting overlay canvases...>>%logdir%\%yyyy%%mm%.log
del %workdir%\???.png echo %ClientID%_%timeCode%: Composites done.  Making MP4...>>%logdir%\%yyyy%%mm%.log cd %workdir%
```

FIG. 5.7

```
avconv -i %%03d.tif -i %trailerdir%\wav\audio.wav -r 24 -vcodec mpeg4 -acodec libvo_aacenc -
ab 32k -vb 4000k -y %webdir%\sios\%ClientID%_%timeCode%.mp4

::      View the MP4.  Helpful during debug, otherwise disable.
::"C:\Program Files\VideoLAN\VLC\vlc.exe" --fullscreen
%webdir%\sios\%ClientID%_%timeCode%.mp4

::      Revise the HTML feedback page to show the MP4 link.
echo %ClientID%_%timeCode%.mp4 >>html2A.txt
copy html2A.txt+html2B.txt %webfeed% echo %ClientID%_%timeCode%: MP4 completed.>>%logdir%\%yyyy%%mm%.log
echo %ClientID%_%timeCode%: Pre-generated TIFF frames complete, ready for DCP
conversion.>>%logdir%\%yyyy%%mm%.log ::              Check for the OPENDCP_J2K executable.  Give up if not found.  >>Add logging
and user feedback to the error subroutines<<
if not exist "%odcppath%\opendcp_j2k.exe" goto error4

::              Zip through the JPEG job
cd %workdir%
md j2c
"%odcppath%\opendcp_j2k.exe" -i %workdir% -o j2c echo.
echo %ClientID%_%timeCode%: JPEGs complete.>>%logdir%\%yyyy%%mm%.log ::              We have nice compact JPEGs now.  Get rid of those enormous TIFFs.
del %workdir%\???.tif echo.
echo %ClientID%_%timeCode%: Converting audio and video to DCP-compatible MXF
files...>>%logdir%\%yyyy%%mm%.log ::              Make MXFs...
md dcp
cd dcp ::              The usual check for the necessary executable.  >>Add logging and user
feedback to the error subroutines<<
if not exist "%odcppath%\opendcp_mxf.exe" goto error5

::              The rubber meets the road.
"%odcppath%\opendcp_mxf.exe" -i %trailerdir%\wav\audio.wav -o audio.mxf
"%odcppath%\opendcp_mxf.exe" -i ..\j2c -o video.mxf ::              Cleanup time.  Delete everything but the MP4 (which remains useful for easy
review).
cd ..
```

FIG. 5.8

```
del /f /q j2c\*.*>nul
rd j2c>nul

::              Explain our progress.
echo %ClientID%_%timeCode%: The MXF files have been created and unnecessary files deleted.>>%logdir%\%yyyy%%mm%.log
::              The final step is to create the related XML files to complete the DCP package.

::              Make DCP(XML)...
echo %ClientID%_%timeCode%: Making dcp...>>%logdir%\%yyyy%%mm%.log
cd dcp ::              Check for the exe.  >>Add logging and user feedback to the error subroutines<<
if not exist "%odcppath%\opendcp_xml.exe" goto error6

::              This is it!
"%odcppath%\opendcp_xml.exe" -r video.mxf audio.mxf -i "%issuer%" -a "%annotation%" -t %title% -m %rating% -k %kind%
cd %workdir%
echo %ClientID%_%timeCode%: DCP complete.>>%logdir%\%yyyy%%mm%.log ::      Zip it up and send it to the SIOS folder on the web server.  Then delete the hugeness.
echo %ClientID%_%timeCode%: Delivering the DCP to the web server...>>%logdir%\%yyyy%%mm%.log
"%zippath%\7z.exe" a %webdir%\sios\%ClientID%_%timeCode%.zip dcp
del /q dcp\*.*
rd dcp ::      Establish finish time in terms of seconds elapsed in the current day.
echo %ClientID%_%timeCode%: Marking the finish time (calling %batdir%\time2var.bat)...>>%logdir%\%yyyy%%mm%.log call %batdir%\date2var.bat
call %batdir%\time2var.bat set /a doneCode=%sec%+(%min%*60)+(%hour%*3600)
if not exist %logdir%\%yyyy%%mm%.log echo. >%logdir%\%yyyy%%mm%.log
echo %ClientID%_%timeCode%: doneCode=%doneCode%>>%logdir%\%yyyy%%mm%.log ::      Calculate elapsed time processing the request
echo Checking on job speed...
if /i %startCode% GTR %doneCode% set /a %doneCode%=%doneCode%+86400
set /a ElapsedTime=%doneCode%-%startCode%
echo %ClientID%_%timeCode%: Job done in %ElapsedTime% seconds.>>%logdir%\%yyyy%%mm%.log :end
```

FIG. 5.9

Date2var

```
@echo off
::       date2var.bat Copyright 2006-2017 by pchelp
::       Creates variables expressing current date.
::
::       syntax: date2var.bat [-u I -h I -v]
::
::       -u erases the variables created by date2var.bat
::       -h shows this text
::       -v verbose: echoes variable values
::
::       Variables:
::            yyyy = year in 4 digits    e.g.: 2006
::            mm   = month in 2 digits   e.g.: 03
::            dd   = day in 2 digits     e.g.: 29
::            dow  = day of week, abbrev e.g.: Wed
::            mdy  = mm/dd/yyyy          e.g.: 03/29/2006
if "%1"=="-h" goto help
if "%1"=="/?" goto help
set yyyy=&set mm=&set dd=&set mdy=&set dow=
if "%1"=="-u" goto end
for /F "tokens=1" %%d IN ("%date%") do set dow=%%d
for /F "tokens=2" %%d IN ("%date%") do set mdy=%%d
for /F "delims=/ tokens=3" %%d IN ("%mdy%") do set yyyy=%%d
set yyyy=%yyyy:~0,4%
for /F "delims=/ tokens=1" %%d IN ("%mdy%") do set mm=%%d
for /F "delims=/ tokens=2" %%d IN ("%mdy%") do set dd=%%d
if "%1"=="-v" echo.
if "%1"=="-v" echo Variables created.
if "%1"=="-v" echo It's %dow%, day %dd% of month %mm% of the year %yyyy%, or %mdy%.
if "%1"=="-v" echo.
goto end
:help
set cronk=::
echo.
type %~nx0|find "%cronk%    "
echo.
set cronk=
:end
```

Dotext

```
::       Variables are:
::       "text" font fill points strokew strokec rotate filename
::       Must include all variables
::       example: dotext "Happy Birthday" Brannboll gold 100 1 goldenrod 345 UL.png
::       example: dotext "Enjoy the Show!" Ballpark-Weiner DarkSlateBlue 70 1.4 black 0
LR.png
```

FIG. 5.10

::      example: dotext "From Your Friends At" Franklin-Gothic-Medium black 70 0 black 0 UR.png

```
@echo off
set text=%1
set font=%2
if %font%==Brannboll set font=Brannboll-F-PERSONAL-USE-ONLY
set fill=%3
set points=%4
set strokew=%5
set strokec=%6
set rotate=%7
set fileout=%8

:: echo %text% %font% %fill% %points% %strokew% %strokec% %rotate% %fileout%

ECHO %text%>x&FOR %%? IN (x) DO SET /A strlength=%%~z? - 4&del x
::ECHO %text%> tempf
::FOR %%L IN (tempf) DO ( SET /A strlength=%%~zL - 4 )
::del tempf>nul
set /a "width=%strlength%*%points%"
set /a "width=width*85"
set /a "width=width/100"
set height=%width%
::set /a "height=%points%*300"
::set /a "height=height/100"

:: echo %height%x%width% magick convert -size %width%x%height% xc:transparent -fill %fill% -font %font% -pointsize %points% -strokewidth %strokew% -stroke %strokec% -gravity center -annotate %rotate% %text% ( +clone -background none -shadow 80x4 ) -gravity center -geometry -4-4 +swap +repage -composite %fileout% magick convert %fileout% -trim +repage %fileout%

::( +clone -background black -shadow 80x5 ) -gravity center -geometry -5-5 +swap +repage -composite
```

Fadein

::      fadein.bat
::      fadein srcfilepath\name offset startframe endframe blendrate tgtfolder

```
@echo off set srcfile=%1
set offset=%2
```

```
set startframe=%3
set endframe=%4
set blendrate=%5
set tgtfolder=%6
set fastcopy=0 set blend=%blendrate%
set framenum=%startframe% echo Fading-in %srcfile% at coordinates %offset% starting at frame %startframe%

:loop set padframenum=000%framenum%
set padframenum=%padframenum:~-3%
set canvasfile=%padframenum%.png if not exist %tgtfolder%\%canvasfile% goto error1 if %fastcopy%==0 goto nocopy
copy /y %tgtfolder%\%lastframenum%.png %tgtfolder%\%canvasfile%>nul
goto bypass
:nocopy magick composite %srcfile% -blend %blend% -geometry %offset% %tgtfolder%\%canvasfile% -gravity center %tgtfolder%\%canvasfile%
:bypass if not %blend%==100 goto fadingin
set fastcopy=1
set lastframenum=%padframenum%
goto reloop
:fadingin set /a blend=blend+%blendrate%
if /i %blend% GTR 100 set blend=100

:reloop
if %framenum%==%endframe% goto end
set /a framenum=framenum+1
goto loop

:error1
echo Target file %tgtfolder%\%canvasfile% or its folder does not exist.
goto end :end
```

FIG. 5.12

Fido

```
::      Fido.bat -- Part of the SIOS contraption -- Fido is a watchdog.
::      Fido links the "constructor" script suite to the web form inputs.
::      Fido loops endlessly until stopped manually. It runs as a service using nssm.exe.
::      Watches for the appearance of a .bat file in the web server /temp folder (%watchdir%).
::      Checks every %interval% seconds, until a .bat file is found.
::      Fido then calls upon Shepherd.bat to deal with the "stray" batfile.
::      More than one request may come in over a short period of time.
::      The minor complexity here is to ensure "first come first serve" applies.
@echo off ::      The script calls itself recursively.
if -%1==- goto vars
goto %1

::      Vars are self-explanatory.
:vars
set interval=4
set sitedir=C:\ProgramData\Hiawatha\sios
set watchdir=%sitedir%\temp
set siosdir=C:\ProgramData\SIOS
set batdir=%siosdir%\Batch
set logdir=%siosdir%\logs
set lingercount=0 call %batdir%\date2var.bat
call %batdir%\time2var.bat cls
if not exist %logdir%\%yyyy%%mm%.log echo. >%logdir%\%yyyy%%mm%.log
echo Fido started %date% %time%>>%logdir%\%yyyy%%mm%.log :watchloop
timeout /t %interval% >nul
set stray=
if not exist %watchdir%\*.bat goto watchloop
for %%f in (%watchdir%\*.bat) do call "%~f0" fcfs "%%f"
if -%stray%==- goto watchloop
::      Avoid repeated triggering of the same job
if !%last_trigger%==!%stray% (
set /a lingercount+=1
::      Kill the attempted job after %interval% x %lingercount% seconds.
if %lingercount% geq 8 (
del %stray%
echo Fido Possible failure %date% %time%>>%logdir%\%yyyy%%mm%.log
set lingercount=0
)
goto watchloop
```

FIG. 5.13

)
start "SIOS" /d "%siosdir%" /min "%batdir%\Shepherd.bat"
echo Fido triggered %date% %time%>>%logdir%\%yyyy%%mm%.log
set last_trigger=%stray%
set lingercount=0
goto watchloop :fcfs
if -%stray%==- set stray=%~f2
:end

Grabdims

::      grabdims name [/q]
::      example: grabdims ML /q
::      appends '.png' to the filename
::      /q = quiet, no feedback
@echo off
magick identify -verbose %1.png|find "Geometry">%1geo.txt
for /f "tokens=2 delims=x+ " %%i in (%1geo.txt) do set gotwidth=%%i
for /f "tokens=3 delims=x+ " %%i in (%1geo.txt) do set gotheight=%%i
if #%2==#/q goto fini
echo width of %1 = %gotwidth%
echo height of %1 = %gotheight%
:fini
del %1geo.txt

Presconstructor

::      constructor.bat foldername "nametext" logofile picfilepath\name
::      example: custom work "Alexandria" logos\000011 bdaypic\Alexandria.jpg @echo off ::              App_paths
set vlcpath=C:\Program Files\VideoLAN\VLC
set avconvpath=C:\ProgramData\libav-11.3-win64\win64\usr\bin
set odcppath=C:\Program Files\OpenDCP\bin
set zippath=C:\Program Files\7-Zip ::      DCP XML Parameters
if exist %trailerdir%\DCPXML.bat call %trailerdir%\DCPXML.bat
::      (Might this need an error action or defaults?)

::      Get date and time variables
::call "batch\date2var.bat"
::call "batch\time2var.bat"

::set job=%ClientID%_%timeCode%

FIG. 5.14

```
echo Acquiring canvas frames
::      These are premade to save time.
cd %workdir%
copy %trailerdir%\blanks\???.png .>nul
if exist 216.png echo Blank canvases acquired.
set canvasdir=%trailerdir%\canvas\%ratio% echo Creating name graphic for %celebrant%...
::      Match style and size to the premade template.
call %batdir%\dotext "%celebrant%" Brannboll gold 100 1 goldenrod 345 ML.png ::      We have the formatted text graphic, but is it the right size?  It may be lengthy.
::      Reduce size to its allocated area if necessary otherwise leave it alone.
call %batdir%\grabdims ML /q
set resize=0
if /i %gotwidth% GTR 720 set /a resize=resize+1
if /i %gotheight% GTR 266 set /a resize=resize+1
if /i %resize% GTR 0 magick convert ML.png -resize 720x266 ML.png
set resize= echo Preparing client logo.
::      Just resize it for now.
magick convert %siosdir%\Logos\%ClientID%.png -resize 720x400 MR.png echo Preparing photo image.
::      Grab the photo, resize it and add drop shadow
::magick convert %webimage% -resize 700x500 tmp.jpg
::del %webimage%
::move /y tmp.jpg %webimage%
magick convert %webimage% -resize 700x500 -alpha on ( +clone -background none -shadow 70x4 ) +swap -composite LL.png
magick convert LL.png %clientdir%\%timeCode%.jpg
del %webimage% echo Adding custom elements to the canvases...
::      Effects are chosen here, currently either fadein or wipe
::call %batdir%\fadein LL.png -479+165 20 55 10 %workdir%
::call %batdir%\fadein ML.png -479-230 51 132 20 %workdir%
::call %batdir%\fadein MR.png +479-125 122 216 10 %workdir% copy %trailerdir%\*.png %workdir% call %batdir%\fadein UL.png -479-360 38 111 10 %workdir%
call %batdir%\fadein UR.png +479-385 101 185 10 %workdir%
call %batdir%\fadein LR.png +479+135 180 216 20 %workdir% echo compositing canvases with the template TIFFs...
::      Merge canvases with the frameset
```

FIG. 5.15

```
set frame=0

:loop2
set /a frame=frame+1
set padframe=000%frame%
set padframe=%padframe:~-3% if not exist %canvasdir%\%padframe%.tif goto check if %ratio%==Scope magick convert %workdir%\%padframe%.png -resize 1547x836 %workdir%\%padframe%.png
magick composite -gravity center %workdir%\%padframe%.png %canvasdir%\%padframe%.tif %workdir%\%padframe%.tif goto loop2

:check
echo Deleting overlay canvases...
del %workdir%\???.png echo Composites done.  Making MP4 as a check on the product...

::cd %1
avconv -i %%03d.tif -i %trailerdir%\wav\audio.wav -r 24 -vcodec h264 -acodec libvo_aacenc -ab 32k -vb 2000k -y %webdir%\sios\%ClientID%_%timeCode%.mp4
::cd ..
::goto skipdemo ::"C:\Program Files\VideoLAN\VLC\vlc.exe" --fullscreen %webdir%\sios\%ClientID%_%timeCode%.mp4

::del %workdir%\???.tif
::goto end

:skipdemo copy 04b.txt 04w.txt >nul
copy 05b.txt 05w.txt >nul
echo 35%% >>05w.txt
echo "/sios/%ClientID%_%timeCode%.mp4" >>04w.txt
call %batdir%\assemble.bat 01b 02 03b 04w 05w 06a 07w 08w 09 echo MP4 completed.
echo Pre-generated TIFF frames complete, ready for DCP conversion.

::            Check for the OPENDCP_J2K executable.  Give up if not found.
if not exist "%odcppath%\opendcp_j2k.exe" goto error4
```

FIG. 5.16

```
::              Zip through the JPEG job
cd %workdir%
md j2c
"%odcppath%\opendcp_j2k.exe" -i %workdir% -o j2c echo.
echo JPEGs complete.

::              We have nice compact JPEGs now.  Get rid of those enormous TIFFs.
del %workdir%\???.tif echo.
echo Converting audio and video to DCP-compatible MXF files...

::              Make MXFs...
md dcp
cd dcp

::              The usual check for the necessary executable.
if not exist "%odcppath%\opendcp_mxf.exe" goto error5

::              The rubber meets the road.
"%odcppath%\opendcp_mxf.exe" -i %trailerdir%\wav\audio.wav -o audio.mxf
"%odcppath%\opendcp_mxf.exe" -i ..\j2c -o video.mxf ::              Cleanup time.  Delete everything but the MP4 (which remains useful for easy
review).
cd ..
::del /f /q wav\*.*>nul
::rd wav>nul
del /f /q j2c\*.*>nul
rd j2c>nul ::              Explain our progress.
echo.
echo The MXF files have been created and unnecessary files deleted.
echo.
echo The final step is to create the related XML files to complete the DCP package.

::              Make DCP(XML)...
cd dcp

::              Check for the exe.
if not exist "%odcppath%\opendcp_xml.exe" goto error6

::              This is it!
"%odcppath%\opendcp_xml.exe" -r video.mxf audio.mxf -i "%issuer%" -a "%annotation%" -t
%title% -m %rating% -k %kind%
```

FIG. 5.17 cd ..

echo DCP complete.

"%zippath%\7z.exe" a %webdir%\sios\%ClientID%_%timeCode%.zip dcp
del /y dcp
rd dcp
::explorer.exe c:\users\user\desktop\CRG\dcp :end

Reports

@echo off

::      Vars
set reportpath=%sitedir%\reports
set reportname=%yyyy%-%mm%_SIOSReport.csv
set tsvname=%yyyy%-%mm%_SIOSReport.tsv if exist %reportpath%\%reportname% goto append1
echo TimeCode,Date,Time,ClientID,TrailerNumber,Format,ProcessTime>%reportpath%\%reportname%
:append1
echo %timeCode%,%mdy%,%hour2%:%min%:%sec%,%ClientID%,%trailernum%,%ratio%,%ElapsedTime%>>%reportpath%\%reportname% if exist %reportpath%\%tsvname% goto append2
echo TimeCode    Date    Time    ClientID    TrailerNumber Format    ProcessTime>%reportpath%\%tsvname%
:append2
echo %timeCode%    %mdy%    %hour2%:%min%:%sec%    %ClientID%    %trailernum%    %ratio%    %ElapsedTime%>>%reportpath%\%tsvname% goto end

:end

Shepherd

::      Called by Fido.bat, this script runs the "trailer constructor."
::      It sets the parameters and conditions for the constructor's operation and puts it to work.
::      Variables set by Fido.bat: siosdir stray batdir
::      variables set by Shepherd: webdir siosdir webfeed mp4name zipname webimage clientdir workdir trailerdir
@echo off

FIG. 5.18

```
::      Should be in siosdir already but let's make certain.
cd %siosdir%

::      %stray% is the full-path filename of the batchfile output of the PHP webform script.
::      call %stray% to set variables: picname celebrant ratio ClientID timeCode trailernum fileExt
echo %ClientID%_%timeCode%: Shepherd calling %stray%>>%logdir%\%yyyy%%mm%.log
call "%stray%"
::      NOTE: If this file isn't deleted, Fido will delete it after about 30 seconds.
del "%stray%" >nul ::      Vars
set webdir=C:\ProgramData\Hiawatha\sios
set imagename=%ClientID%_%timeCode%.%fileExt%
set webimage=%webdir%\uploads\%imagename%
set pagename=%ClientID%_%timeCode%.html
set webfeed=%webdir%\sios\%pagename%
set mp4name=%webdir%\sios\%ClientID%_%timeCode%.mp4
set zipname=%webdir%\sios\%ClientID%_%timeCode%.zip
set clientdir=%siosdir%\Clients\%ClientID%
set workdir=%siosdir%\working\%timeCode%_%ClientID%
set trailerdir=%siosdir%\trailers\Trailer%TrailerNum% call %batdir%\date2var.bat
call %batdir%\time2var.bat

::      Create folders
if not exist %logdir%\%yyyy%%mm%.log echo. >%logdir%\%yyyy%%mm%.log
echo %ClientID%_%timeCode%: Shepherd creating temp folders %clientdir% and %workdir%>>%logdir%\%yyyy%%mm%.log
if not exist %clientdir% md %clientdir%
if not exist %workdir% md %workdir%

::      Retrive the uploaded image and adjust its pointer
echo %ClientID%_%timeCode%: Acquiring the uploaded image %webimage% from %workdir%>>%logdir%\%yyyy%%mm%.log
move /y %webimage% %workdir% >nul
set webimage=%workdir%\%imagename%

::      Prepare to build feedback pages
copy /y html\*.txt %workdir% >nul

::      start working out of %workdir%
echo Shifting operations to %workdir%
cd %workdir%

::      Feedback page 1
```

FIG. 5.19

```
echo %ClientID%_%timeCode%: User feedback goes to %webfeed%
>>%logdir%\%yyyy%%mm%.log
copy html1A.txt %webfeed% >nul echo %ClientID%_%timeCode%: Calling the Constructor to execute job
%ClientID%_%timeCode% at %time%>>%logdir%\%yyyy%%mm%.log
call %batdir%\Constructor.bat cd %workdir%

::      Final feedback page
echo Job done, tell the user via webfeed
echo %ClientID%_%timeCode%.mp4>>html3A.txt
echo %ClientID%_%timeCode%.zip>>html3B.txt
copy html3A.txt+html3B.txt+html3C.txt %webfeed%

::      Cleanup.
echo %ClientID%_%timeCode%: Cleaning up %date%
%time%>>%logdir%\%yyyy%%mm%.log
del /q *.txt
del /q *.jpg
cd ..
rd %workdir%
call %batdir%\cleanup.bat ::      File a report.
echo %ClientID%_%timeCode%: Appending job info to reports and exiting
Shepherd>>%logdir%\%yyyy%%mm%.log
call %batdir%\reports.bat goto end :end
exit
```

Time2var

```
@echo off
::      time2var.bat Copyright 2006-2017 by pchelp
::      Creates variables expressing current time.
::
::      syntax: time2var.bat [-u | -h | -v]
::
::      -u erases the variables created by time2var.bat
::      -h shows this text
::      -v verbose: echoes variable values
::
::      Variables:
::              hour = hours              e.g.: 7
```

FIG. 5.20

```
::                hour2 = hours forced 2 digits  e.g.: 07
::                min   = minutes               e.g.: 59
::                sec   = seconds               e.g.: 59
::                hsec  = hundredths of seconds e.g.: 99
::           timestring = current time          e.g.: 7:59:59.99
if "%1"=="-h" goto help
if "%1"=="/?" goto help
set hour=&set min=&set sec=&set hsec=&set timestring=
if "%1"=="-u" goto end
for /F "tokens=2" %%d IN (". %time%") do set timestring=%%d
for /F "delims=: tokens=1" %%d IN ("%timestring%") do set hour=%%d
set hour2=%hour%
if %hour% lss 10 set hour2=0%hour%
for /F "delims=: tokens=2" %%d IN ("%timestring%") do set min=%%d
for /F "delims=: tokens=3" %%d IN ("%timestring%") do set sec=%%d
for /F "delims=. tokens=2" %%d IN ("%sec%") do set hsec=%%d
for /F "delims=. tokens=1" %%d IN ("%sec%") do set sec=%%d
if not "%1"=="-v" goto end
echo. & echo Time variables created.
echo The current time is %timestring%
echo or, %hour% hours, %min% minutes, %sec%.%hsec% seconds
echo.
goto end
:help
echo. &set cronk=::
type %~f0|find "%cronk%      "
echo. &set cronk=
:end
```

Cleanup

```
@echo off
::       self-call redirect
if not -%1==- goto %1

::       Get the current date.
call %batdir%\date2var
echo on
::       Vars
set outname=%ClientID%_%timeCode%
set outdir=%siosdir%\cleanup
if not exist %outdir% md %outdir%
set outfile=%outdir%\%outname%.bat ::       Create a cleanup variable set for the current job.
echo set wasname=%outname%>%outfile%
echo set wasyear=%yyyy%>>%outfile%
echo set wasmonth=%mm%>>%outfile%
echo set wasday=%dd%>>%outfile%
```

FIG. 5.21

```
::      Step through existing cleanup files, checking each for expiration.
for %%F in (%outdir%\*.bat) do call %~f0 selfcall "%%~fF"
goto end ::      Nested checks for year, month, day
::      If the day has advanced by two, files are deleted.
::      If the year or month has advanced, simply reset the "was" variables to current date.
::      If the clock is badly off, "was" variables also get reset, enabling cleanup.
:selfcall
call %2
set /a daycheck=%wasday%+1
if %yyyy%==%wasyear% (
if %mm%==%wasmonth% (
if %dd%==%wasday% (
goto end
) else (
if /i %dd% GTR %daycheck% (
del %webdir%\sios\%wasname%.html
del %webdir%\sios\%wasname%.mp4
del %webdir%\sios\%wasname%.zip
del %2
goto end
) else (
goto end
)
)
) else (
echo set wasmonth=%mm%>>%2
echo set wasday=%mm%>>%2
)
) else (
echo set wasyear=%yyyy%>>%2
echo set wasmonth=%mm%>>%2
echo set wasday=%dd%>>%2
)
:end
```

FIG. 5.22

ON-DEMAND AND REAL-TIME TRAILER GENERATION SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

Field of the Invention

The present disclosure is directed to the generation of media content, such as theatrical trailers, in an on-demand, real-time, and/or near real-time manner. More specifically, but not by limitation, the present disclosure can receive user-selected content, assess the user-selected content, select an appropriate trailer template, convert/combine the user-selected content into the appropriate theatrical trailer template, and store or output a trailer that can be displayed at a theatre on-demand, real-time, and/or near real-time.

SUMMARY OF THE INVENTION

According to some embodiments, the present disclosure is directed to a system comprising one or more computers that can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by a data processing apparatus, cause the apparatus to perform the actions. One general aspect includes displaying a graphical user interface (GUI) that includes an input interface that receives a user-selected file that includes at least one image; receiving the user-selected content; converting, on-demand, the user-selected content into a digital cinema package file by combining the user-selected file with a templated media; and outputting, on-demand, the digital cinema package file for presentation within a movie theatre. Other embodiments of this aspect include corresponding computer systems, apparatus, and computer programs recorded on one or more computer storage devices, each configured to perform the actions of the methods.

Some implementations may include one or more of the following features: The GUI preferably includes a selectable formatting option. The GUI also includes an input interface that receives a unique customer identifier that is associated with the user-selected content. The templated media includes any of video and audio content. The method further includes generating a second format version of the digital cinema package file that is suitable for distribution and display on a social network. The method also includes assessing a domain of the user-selected content; and selecting the templated media based on the domain, the domain defining a subject-matter or theme of the user-selected content. The method includes placing the user-selected content into the templated media. The templated media includes an advertisement or logo for the theatre. The method further includes generating and storing an event log of the converting step. Implementations of the described techniques may include hardware, a method or process, or computer software on a computer-accessible medium.

Some embodiments comprise a method that includes displaying, by a theatre trailer generator at a theatre, a graphical user interface (GUI) that includes an input interface that receives a user-selected content, where the user-selected content includes text, photos, graphics, or other media; receiving the user-selected content when a user is in the theatre using a portal that provides the GUI; converting, in real-time or near-real-time, the user-selected content into a digital cinema package file by combining the user-selected file with a templated video; and outputting, in real-time or near-real-time, the digital cinema package file for presentation within the theatre. Other embodiments of this aspect include corresponding computer systems, apparatus, and computer programs recorded on one or more computer storage devices, each configured to perform the actions of the methods.

Implementations may include one or more of the following features. The method further includes applying one or more formatting options that change an appearance of user-selected content when displayed within the digital cinema package file. Implementations of the described techniques may include hardware, a method or process, or computer software on a computer-accessible medium.

Some embodiments of the present disclosure are directed to a system comprising a processor; and a memory for storing executable instructions, the processor executing the instructions to: (i) display a graphical user interface (GUI) that comprises an input interface that receives a user-selected file that comprises at least one image; (ii) receive the user-selected content; (iii) convert, on-demand, the user-selected content into a digital cinema package file by combining the user-selected file with a templated media; and (iv) output, on-demand, the digital cinema package file for presentation within a theatre.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIGS. 5.1-5.22 illustrate exemplary logic and code associated with an embodiment of the present invention.

DETAILED DESCRIPTION OF THE INVENTION

While this invention is susceptible of embodiment in many different forms, there is disclosed and described herein in detail several specific embodiments with the understanding that the present disclosure is to be considered as an exemplification of the principles of the invention and is not intended to limit the invention to the embodiments illustrated.

In general, the present disclosure is directed to systems and methods that provide on-demand, real-time and/or near real-time creation of customized media content, such as theatrical policy trailers and promotional trailers. These trailers can be generated on-the-fly by movie patrons, in some instances. In various embodiments, a user can provide user-selected content, such as personal images from their mobile device. Other user selected content can include text, audio, video, and so forth. The user-selected content can be integrated into templated media content selected automatically by a system of the present disclosure. In one or more embodiments, a trailer is created by converting, on-demand, the user-selected content into a digital cinema package file by combining the user-selected file with templated media.

In some embodiments, systems and methods disclosed herein can automatically select templated media by assessing a domain of the user-selected content. For example, if the user-selected content is a picture of a birthday event, or the textual content associated with a photo is indicative of a birthday event, the systems and methods can select templated media that is appropriate for a birthday event.

In various embodiments, the user-selected content can be uploaded to a digital cinema package file generating system through a mobile device that is present within a theatre. In other embodiments, the user-selected content can be uploaded to the digital cinema package file generating system through a graphical user interface (GUI) portal.

According to some embodiments, a customized digital cinema package file generated in accordance with the present disclosure can incorporate logos or advertising content that is also integrated into the displayable content (e.g., digital cinema package file).

In some embodiments, the customized digital cinema package file can be reformatted in various formats for use on other platforms such as social media, collaboration platforms, and so forth. These and other advantages of the systems and methods of the present disclosure are provided in greater detail below.

Figure 1:
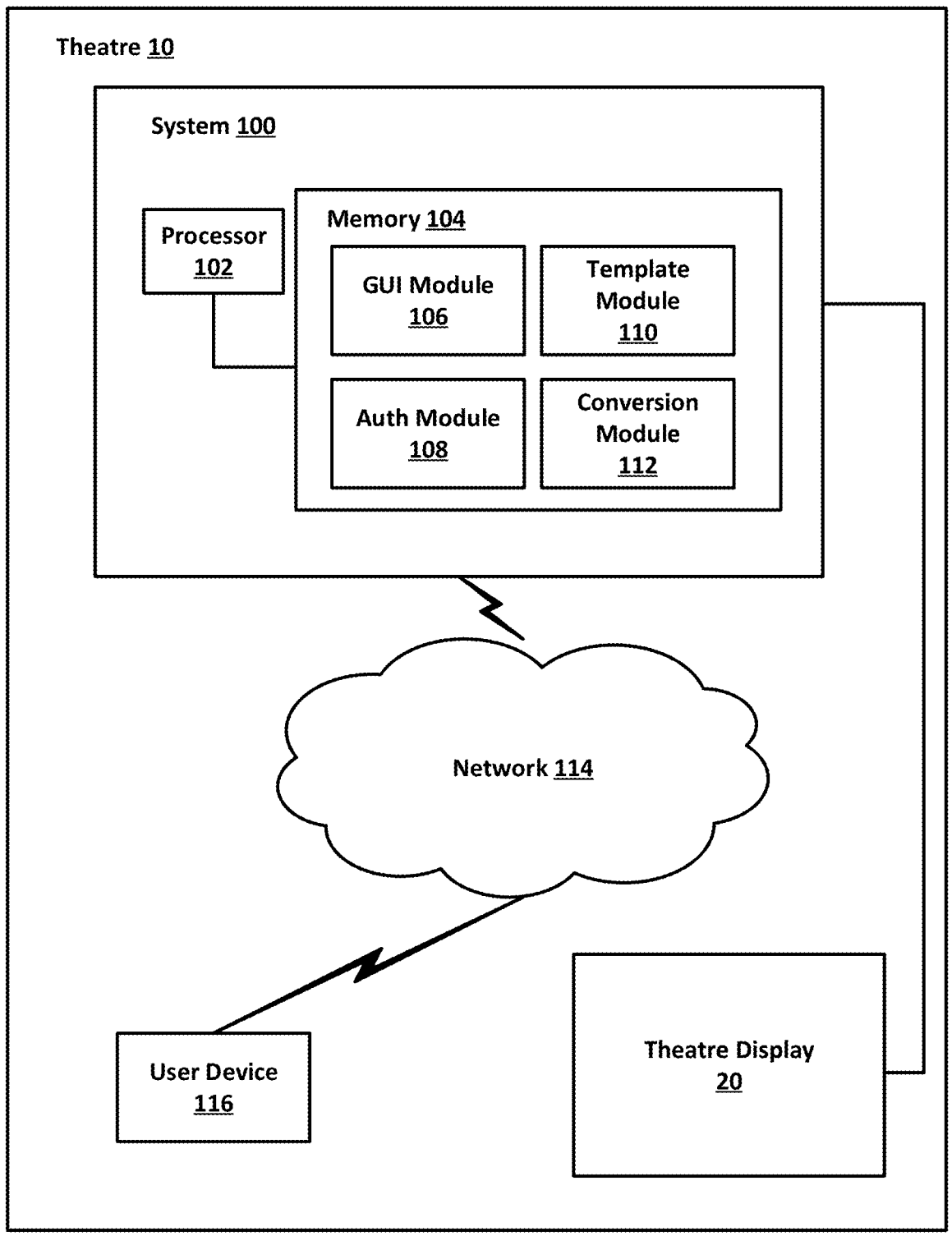
FIG. 1 is a schematic diagram of an example computing architecture constructed in accordance with the present disclosure.

Referring now to FIG. 1, an example system 100 (digital cinema package file generating system) is located in a theatre 10. In general, the theatre 10 comprises at least one display screen or theatre display 20 where movie and other content is displayed, such as the customizable digital cinema package files disclosed herein. Additional aspects of the system 100 can be found with respect to the computing system of FIG. 4.

In some embodiments, the system 100 comprises a processor 102 and memory 104. The memory 104 comprises logic and executable instructions that when executed by the processor 102 cause the system 100 to perform the various methods and functionalities described herein. In some embodiments, the system 100 generates customized digital cinema package file from user-selected input(s) and other data or constraints described herein.

In one embodiment, the memory 104 stores executable modules such as a GUI module 106, an authentication module 108, a template module 110, and a conversion module 112. Additional or fewer modules can be included in the system 100. Each of the modules can be embodied as an application specific integrated circuit ("ASIC"), or a separately and specifically configured computing system as would be known to one of ordinary skill in the art with the present disclosure before them.

In some embodiments, the system 100 can communicate with user devices such as user device 116 that is located within the theatre 10 over a network 114 that can comprise any public or private network infrastructure. By way of example, the network 114 can comprise a local WiFi network in the theatre 10. The user device 116 can comprise any suitable end-user computing device, such as a Smartphone, laptop, or other similar device.

In some embodiments, the system 100 can communicatively couple with the theatre display 20 over a wired or wireless connection, as would be known to one of ordinary skill in the art.

Referring once again to the system 100, the GUI module is configured to provide a plurality of different input user interfaces that allow users to interact with the system 100. In some embodiments, the GUIs can be embodied as an application that can be downloaded to execute on the user device 116. Example GUIs are illustrated and described in greater detail infra with respect to FIGS. 3A-C.

In some embodiments, theatre employees or agents can upload user-selected content into the system 100 to generate customized digital cinema package file(s). In other embodiments, the end user can utilize their user device 116 to upload user-selected content and have the system 100 generate customized digital cinema package file(s) on-demand, on-the-fly, real-time, and near real-time, such as when the end user is watching a movie or other content at the theatre 10. For example, if the end user has brought their family to view a movie at the theatre 10, the end user may desire to create a customized birthday message for their child. The end user can utilize their user device to upload user-selected content into the system 100, and utilize the system 100 to generate a customized digital cinema package file that is displayed on the theatre display 20 prior to their movie.

The authentication module 108 can be executed to authenticate user login credentials and log user identifiers that are associated with instances of customized digital cinema package file(s). In some embodiments, each theatre can be associated with a unique identifier that allows a theatre employee to log into the system 100. An end user can be provided with similar credentials in embodiments where the user is generating content on their own behalf.

In some embodiments, customized digital cinema package file(s) can be linked to the user credentials that were supplied when the user-supplied content was uploaded to the system 100.

After the user/theatre has been authenticated, user-selected content can be uploaded to the system 100. In some embodiments, user-selected content can be any user provided content such as text, audio, video, photos, graphics, or other media—just to name a few.

The user can specify formatting options in some embodiments. These formatting options selectively modify how the user-selected content is displayed when the customized digital cinema package file is generated. For example, the user can select that an image is flattened or otherwise edited.

Once the user-selected content has been uploaded, the system 100 begins the process of converting the user-selected content. In some embodiments, the template module 110 is executed to select templated media. The templated media forms a basis, both in audio and/or video content for the customized digital cinema package file. The digital cinema package file is customized when the user-selected content is integrated into the templated media. In some embodiments, the template module 110 can evaluate a domain of the user-selected content and select the templated media that corresponds to the domain of the user-selected content. In one example, the user-selected content is a picture of a birthday party. The template module 110 can evaluate, for example, metadata of the image and determine that the image is of a birthday party. The template module 110 selects templated media that corresponds to a birthday announcement.

In some embodiments, the user-selected content is integrated into specific locations in the templated media, such as anchor points. For example, the templated media can include a layout location where the user-selected content (e.g., image) is placed into a template video of the selected, templated media. Other layout locations can exist for text, video clips, and so forth.

Once the templated media has been selected, the user-selected content is integrated into the templated media by the conversion module 112. That is, the user-selected content is placed into appropriate or pre-defined locations in the templated media. Some embodiments allow for formatting of the user-selected content.

Some customized digital cinema package files and corresponding templated media comprises an advertisement or logo for the theatre. Thus, in addition to incorporating the user-selected content, the customized digital cinema package file can integrate an advertisement or logo for the theatre.

After generating the customized digital cinema package file, the customized digital cinema package file can be stored locally and/or exported for display on the theatre display 20.

In one or more embodiments, the customized digital cinema package file can also be exported in a format that allows the customized digital cinema package file to be distributed and displayed on a third-party platform, such as a social network, a collaborative network, or other similar system(s) and platform(s). In some embodiments, the system 100 can implement various application programming interfaces (APIs) that allow the conversion module to create and distribute platform specific customized digital cinema package files.

Figure 2:
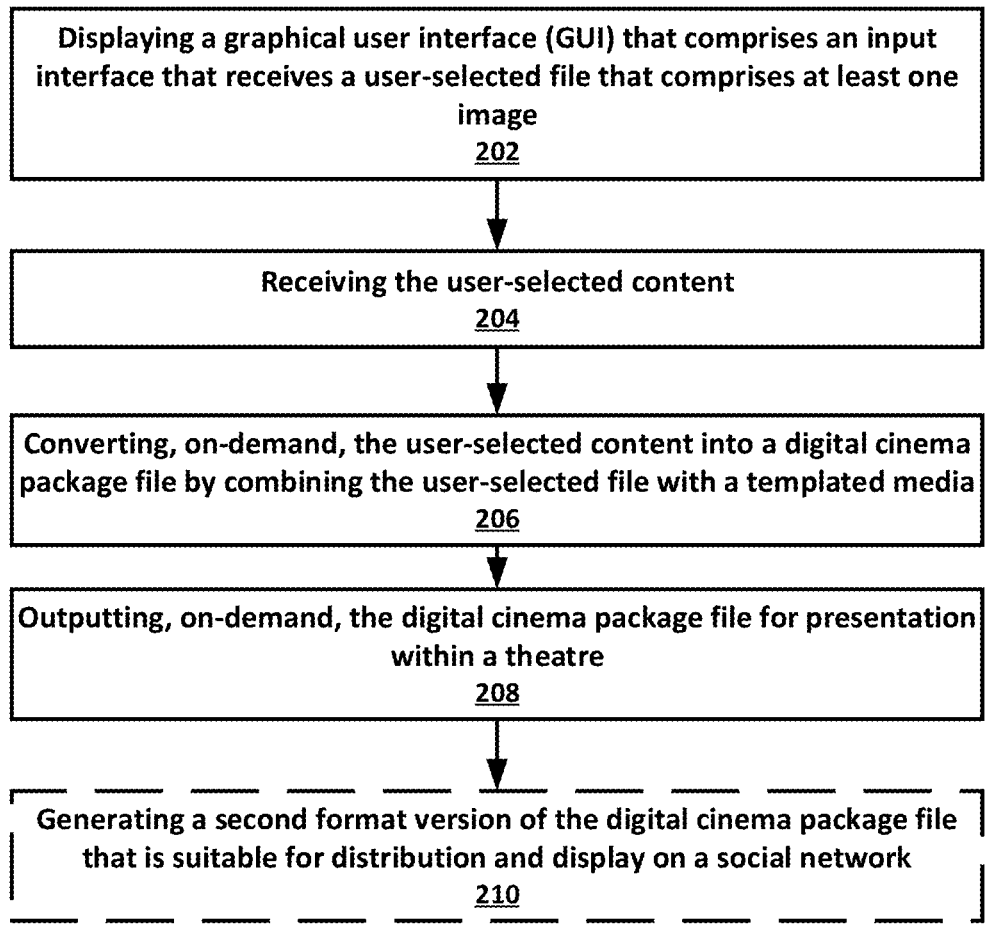
FIG. 2 is a flowchart of an example method of the present disclosure.

Referring now to FIG. 2, which illustrates a method that can be executed by the systems of the present disclosure. The method includes a step 202 of displaying a graphical user interface (GUI) that comprises an input interface that receives a user-selected file that comprises at least one type of content such as an image. An example GUI that receives user-selected content is provided in FIG. 3A. The method includes a step 204 of receiving the user-selected content, and then step 206 of converting, on-demand, the user-selected content into a digital cinema package file by combining the user-selected file with a templated media. In some embodiments, the method includes a step 208 of outputting, on-demand, the digital cinema package file for presentation within a theatre.

An optional step 210 can include generating a second format version of the digital cinema package file that is suitable for distribution and display on a social network.

In one or more embodiments, the system 100 can generate runtime logs that track all input information and track system 100 operations such as templates selected, errors in customized digital cinema package file generation, and so forth.

Figure 3A:
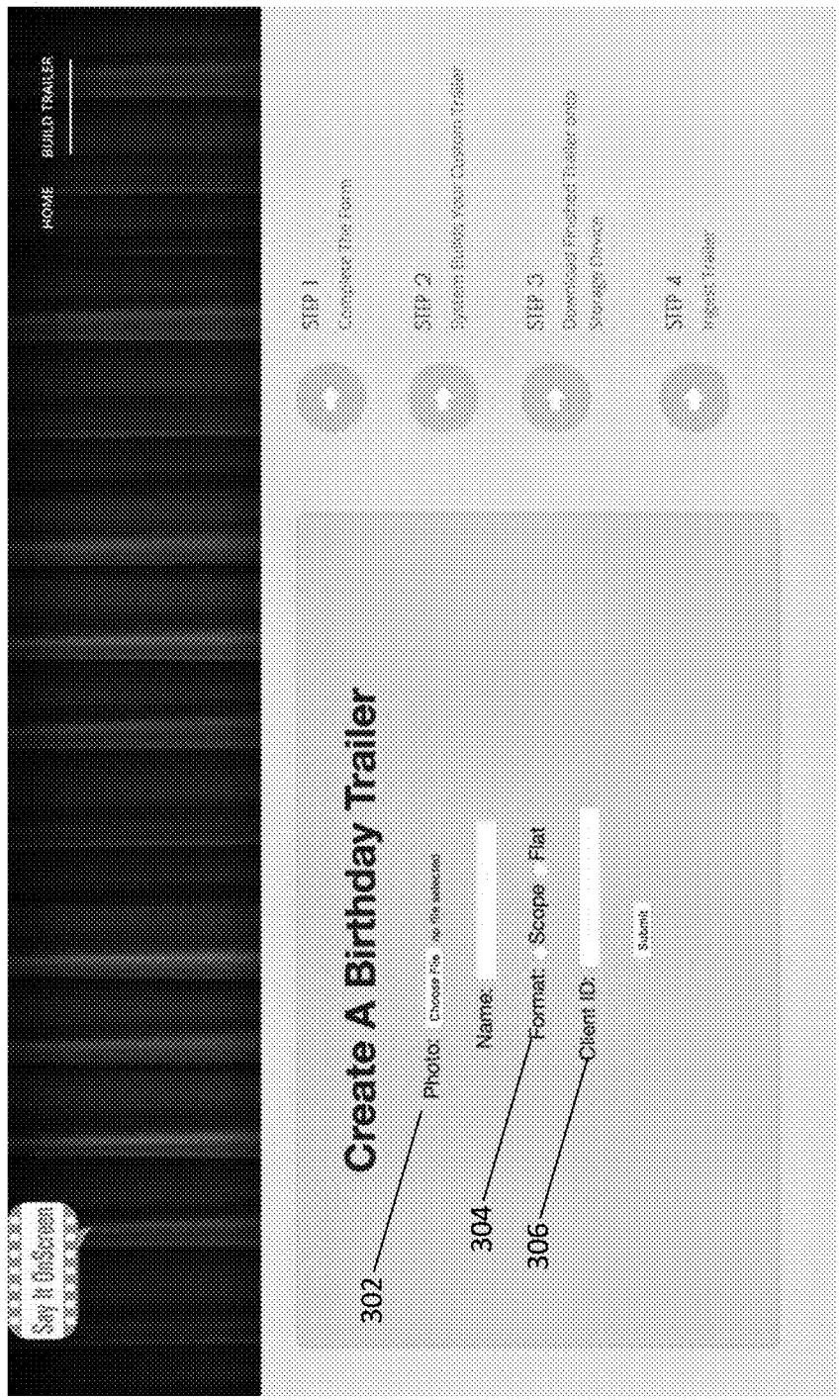
FIGS. 3A-C collectively illustrate various screenshots of example GUIs that are provided to allow users to interact with the systems of the present disclosure.
Figure 3B:
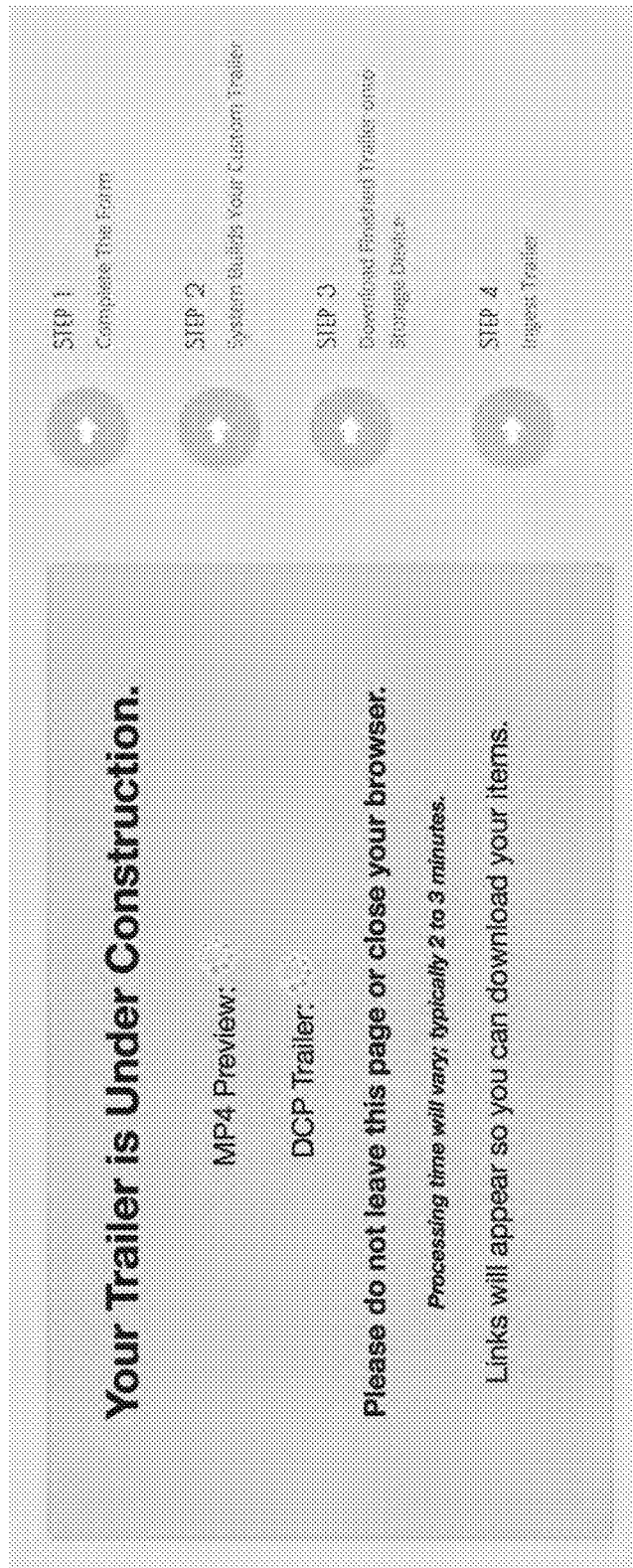
Figure 3C:

FIG. 3A is a screenshot of an example GUI that allows a user to upload user-selected content through an interface 302. The user can select content formatting options using interface 304, as well as enter a user identifier in interface 306. Once received and the form completed, the user is provided with a GUI, as in FIG. 3B that indicates that the system is generating a customized digital cinema package file. In FIG. 3C, a resultant customized digital cinema package file is illustrated. The customized digital cinema package comprises templated video 310, user-selected content 308 that is integrated into a layout position on the templated video 310. Additional textual content, such as a customized message 312 is provided, along with a logo/advertisement 314 for the theatre.

In another embodiment, as noted above, the system can be utilized by either end users (e.g., movie patrons) or by theatre employees. In embodiments where the theatre employee is utilizing the systems of the present disclosure, an example method could include the following non-limiting steps. For example, each theatre is provided with a unique theatre login. The theatre employee logs in using, for example, user identification and a password. Next, the employee uploads photo (or other user-selected content) from phone or from a drive. The employee can obtain the user-selected content directly from the user in some embodiments.

In some embodiments, the employee enters a user's name or other identifier that allows the resultant customized digital cinema package file to be linked to a specific user. The employee can also enter the user's email address.

The system then automatically generates a customized digital cinema package file using selected templated media. User-selected content is then sized and cropped appropriately (if desired). The system automatically calls up the appropriate theatre logo (based on the login credentials) for integration into the customized digital cinema package file.

In some embodiments, the system generates a link enabling the theatre to download the finished, customized digital cinema package file. The system can also email a version of the trailer that can be viewed on other systems, in a common format such as MP3, MP4, or other similar consumer viewable formats.

Figure 4:
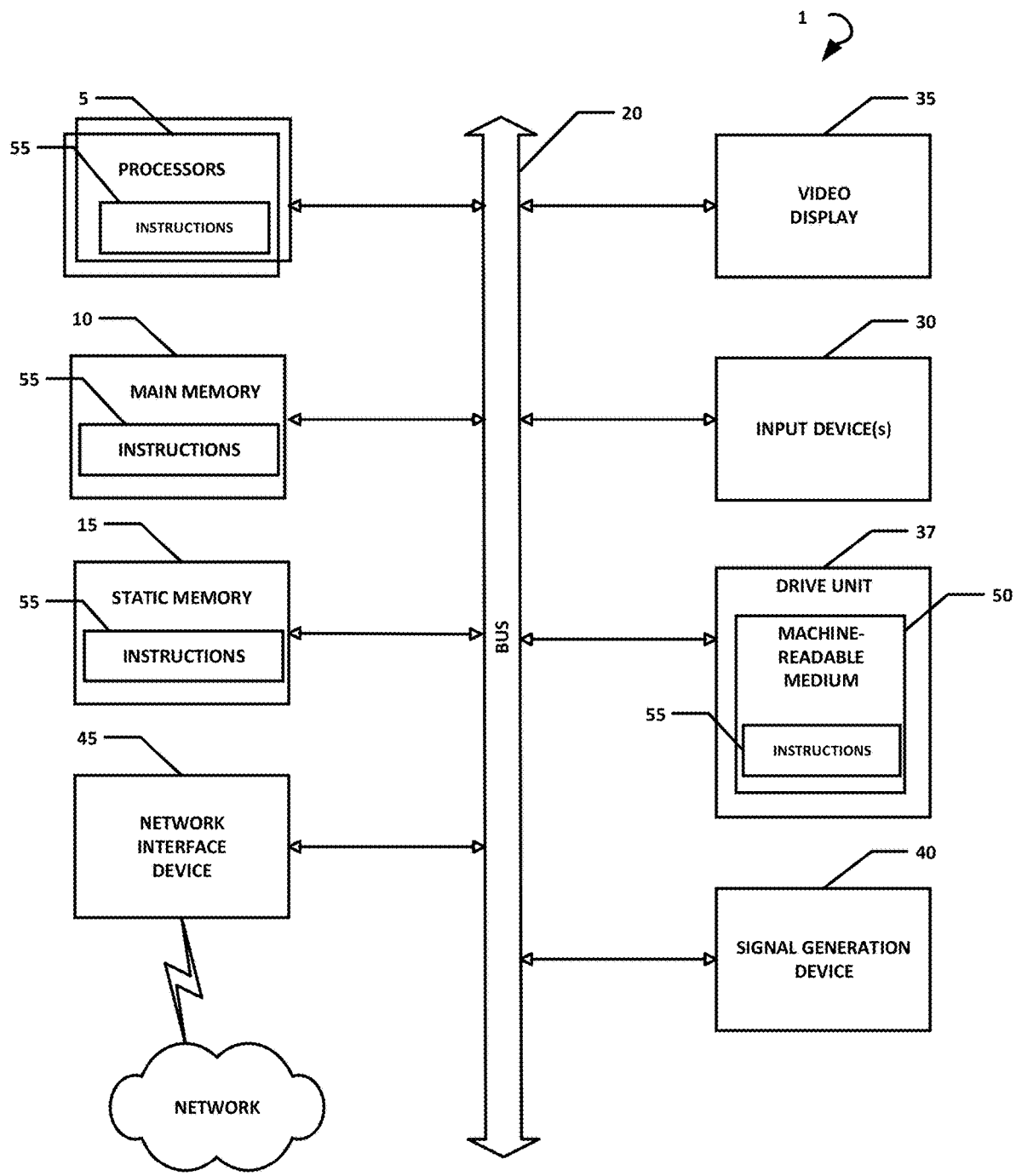
FIG. 4 illustrates an exemplary computing system that may be used to implement embodiments according to the present disclosure.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

FIGS. 5.1-5.22 illustrate exemplary logic and code associated with an embodiment of the present invention.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed and desired to be secured by Letters Patent of the United States is:

1. A method consisting of the steps of:
   displaying a graphical user interface (GUI) that includes comprises an input interface that receives a user-selected file that includes user-selected content;
   receiving the user-selected content;
   converting, on-demand, the user-selected content into a digital cinema package file by combining the user-selected file with a templated media; and
   outputting, on-demand, the digital cinema package file for presentation within a theatre.

2. A method consisting of the steps of:
   displaying, by a theatre trailer generator at a theatre, a graphical user interface (GUI) that includes an input interface that receives a user-selected content, wherein the user-selected content includes text, photos, graphics, or other media;
   receiving the user-selected content when a user is in the theatre using a portal that provides the GUI;
   converting, in real-time or near-real-time, the user-selected content into a digital cinema package file by combining the user-selected file with a templated video; and
   outputting, in real-time or near-real-time, the digital cinema package file for presentation within the theatre.

3. A system consisting of:
   a processor; and
   a memory for storing executable instructions, the processor executing the instructions to:
   display a graphical user interface (GUI) that includes an input interface that receives a user-selected file that includes user-selected content:
   receive the user-selected content;

convert, on-demand, the user-selected content into a digital cinema package file by combining the user-selected file content with a templated media; and output, on-demand, the digital cinema package file for presentation within a theatre.

4. A method consisting of the steps of:

displaying a graphical user interface (GUI) that includes an input interface that receives a user-selected file that includes an user-selected content, wherein the GUI further includes a selectable formatting option, and wherein the GUI further includes an input interface that receives a unique customer identifier that is associated with the user-selected content;

receiving the user-selected content;

converting, on-demand, the user-selected content into a digital cinema package file by combining the user-selected file with a templated media, wherein the templated media includes any one of video and audio content, and wherein converting further includes placing the user-selected content into the templated media, and wherein the templated media includes an advertisement or logo for the theatre;

outputting, on-demand, the digital cinema package file for presentation within a theatre; and generating a second format version of the digital cinema package file that is suitable for distribution and display on a social network.

* * * * *